Patented Aug. 15, 1933

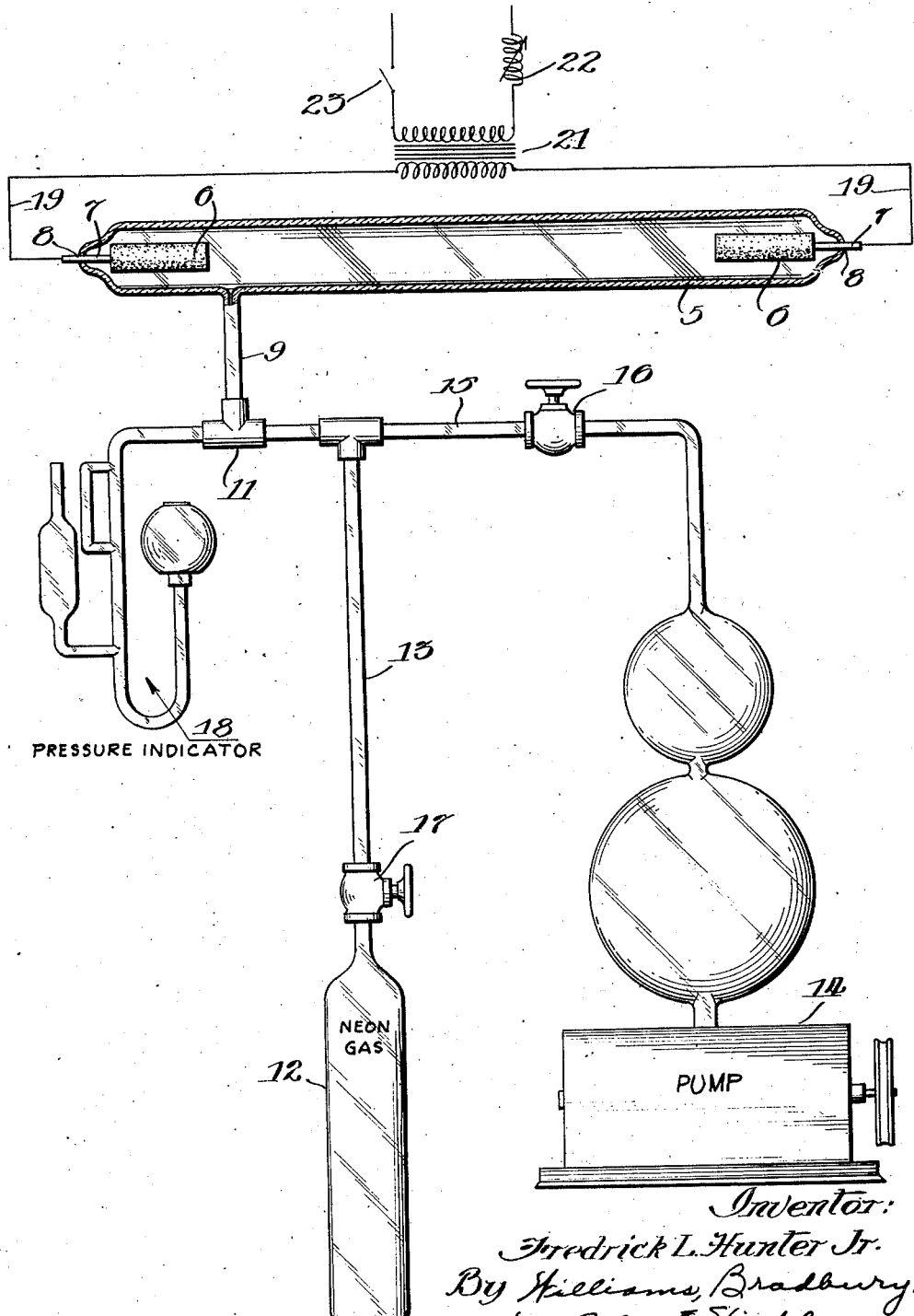

1,922,245

UNITED STATES PATENT OFFICE 1,922,245

MANUFACTURE OF GASEOUS CONDUCTION DEVICES

Frederick L. Hunter, Jr., Lake Bluff, Ill., assignor to Fansteel Products Company, Inc., North Chicago, Ill., a Corporation of New York Application November 28, 1930
Serial No. 498,597

9 Claims. (Cl. 176—2)

This invention relates in general to the manufacture of gaseous conduction devices or tubes which are variously referred to as luminous electrical discharge tubes, vacuum tubes, and electron discharge devices, and the invention has more particular reference to a novel method of and means for processing, conditioning or flashing such devices or tubes.

A primary object of the present invention is the provision of a novel method of manufacturing gaseous conduction devices or tubes in which the occluded gases of the electrodes are employed as a conduction medium for a discharge which will heat and degasify the gaseous conduction device or tube.

An important object of the invention is to utilize the released gases occluded in the electrodes of a gaseous conduction device to increase the gas pressure thereof whereby to avoid deleterious heat effects on the electrodes in the further degasification of the gaseous conduction device or tube.

Another important object of the invention is the provision of an efficient method of and means for rapidly degasifying the electrodes of a gaseous conduction device by an energy input of sufficient magnitude to destroy the electrodes at the initial arcing pressure of gas without deleteriously affecting the electrodes.

A further important object of the invention is to rapidly process or condition a gaseous conduction device while degasifying the electrodes thereof without employing purging agents or external heat.

Another important object of the invention is to so rapidly degasify the electrodes of a gaseous conduction device at a destructive electrical potential that the device is completely degasified and the destructive potential is reduced or entirely removed before the deleterious influences affect the electrodes or the walls of the gaseous conduction device.

Other objects and advantages of my present invention will become apparent from the following description.

The drawing diagrammatically illustrates one arrangement of apparatus for use in the manufacture of gaseous conduction devices processed or conditioned in accordance with the principles of the present invention.

Briefly my invention involves employing an electrical potential or voltage of sufficient magnitude to provide a current density which substantially immediately begins to degasify the electrodes of a gaseous conduction device having a gas pressure which has been reduced to a relatively low value. Such a current density would be sufficient to destroy the electrodes at the gas pressure to which the atmosphere in the device has been reduced in order to establish the initial arc, but for the increase of pressure occasioned by the release of the gases occluded in the electrodes when the electrodes are heated.

The effect of this increase in gas pressure is supplemented by the novel means for supplying the electrical energy used in the degasification of the tube. Such means having the desirable properties of equal open circuit voltage and rated voltage which is automatically reduced as soon as current begins to pass between the electrodes of the tube.

In other words, I propose to provide a novel method of and means for the complete processing or conditioning of a gaseous conduction device in a period of time less than one fourth of the time heretofore required. By so reducing the time of conditioning the gaseous conduction device, I am enabled to heat the electrodes to a greater temperature than has heretofore been advocated without permitting this high temperature melting or otherwise deleteriously affecting the walls of the tube or being conducted by the electrode supports or lead in wires to the seal about such supports or lead in wires whereby to crack the seal about the wires or conductors from the electrodes to the electrical terminals of the tube.

The high electrical potential or voltage employed is sufficient to establish an arc at the relatively low gas pressure to which the atmosphere of the tube is reduced and the heat produced by this luminous column between the electrodes within the tube is sufficient to heat the walls of the tube and to rapidly degasify them at the pressure to which the atmosphere of the tube is raised by the release of the gases occluded in the electrodes.

This novel method of the invention has marked and unexpected advantages over the method of the prior art in that the electrodes and the walls of the gaseous conduction device are quickly and thoroughly degasified and the bodies of the electrodes are sintered or fritted together into denser electrodes which more effectively resist evaporation and distintegration in service. This advantage is particularly noticeable in tubes employing composite electrodes or electrodes requiring heat to complete the reaction between the constituents thereof.

The novel method may, however, be practiced and the means employed to advantage in processing gaseous conduction devices employing other electrodes in order to avoid the step of baking or heating the tube in an oven or other heating means as or before it is flashed or arced. Attention is also here directed to the fact that the present method does not employ the inert or rare gas for arcing or flashing the tube which is subsequently used in the tube, and therefore avoids or eliminates the step of purifying this gas before it is admitted to a tube for service. Such a step requires additional apparatus and chemicals that complicate and add to the expense of flashing or conditioning gaseous conduction devices.

To accomplish the foregoing objects I have schematically shown in the drawing one arrangement of apparatus for processing gaseous conduction devices according to the novel method of the invention. A gaseous conduction device or tube 5 having electrodes 6 supported therein by lead in conductors or supports 7 that usually pass through the ends of the tube and are sealed therein as at 8 is provided with a tubulature 9 communicating with the interior of the tube 5 and projecting therefrom.

The tubulature 9 is connected at its end remote from the tube 5 to a connector, communicating at one side of the tubulature 9 with a suitable source of gas supply 12 by means of a connector or tube 13 and a suitable pump 14 by means of a connector or tube 15. The pump 14 may be any suitable vacuum pump for reducing the atmosphere within the tube 5 when a valve 16 in the connector 15 is opened. The source of gas supply diagrammatically shown at 12 may be adapted to supply any suitable gas such as neon, argon, helium or mixtures thereof to the tube 5 and is controlled by a valve 17 in the connector or tube 13.

The other side of the connector 11 communicates with a pressure indicating device 18 for indicating the pressure of the atmosphere within the tube 5.

When the tube 5 has been sealed to the pump 14, the pump valve 16 is closed and the electrodes 6 are connected by means of leads 19 to the secondary winding of a transformer or source of energy supply 21 adapted to impress at least one thousand volts per foot of tube on the electrodes 6. The primary of the transformer 19 is connected to any variable impedance 22 such as a variable reactance which may be employed to vary the energy delivered by the transformer 21 to the electrodes 6 of the gaseous conduction device.

As illustrated the variable reactance 22 may be a variable inductance of the movable core type of such characteristics as to render the open circuit voltage of the transformer equal to the rated voltage, and the transformer is of such design that the rated voltage is automatically reduced as soon as current passes between the electrodes 6 within the tube 5 by virtue of the variable series inductance 22 connected in the primary of the transformer.

A suitable circuit breaker or switch 23 is also provided in the primary circuit of the transformer 21 and is closed after the tube 5 has been sealed on the pump 14, thereby supplying electrical potential or voltage to the electrodes 6.

As soon as the switch 23 is closed the pump valve 16 is opened and the atmosphere of the tube 5 is diminished until an arc is established between the electrodes 6. The pressure at which such an arc will be established by the voltage delivered from the transformer 21 has been found to be usually about 1 millimeter of mercury. At this pressure the voltage of the transformer 21 is sufficient to establish an arc between the electrodes that fills the bore of the tube as a steady discharge. When such an arc is established the pump valve 16 is closed.

The current density of the electrodes 6, caused by the 1000 volts per foot of tube at the relatively low pressure to which the atmosphere of the tube 5 is pumped, would quickly destroy the electrodes if the pressure within the tube 5 were not increased.

The heating effect of the energy delivered by the transformer 21 at this low pressure is substantially entirely utilized in heating the electrodes 6, causing the electrodes to rapidly give up the gases occluded therein, thereby increasing the gas pressure within the tube 5 sufficiently to prevent destruction of the electrodes. This pressure effect is supplemented by the characteristics of the source of energy supply that is of the transformer 21 and the variable reactance 22 in that the rated voltage of the transformer 21 is automatically reduced below 1000 volts per foot of tube as soon as the current begins to flow between the electrodes 6.

In this manner the electrodes 6 are rapidly and completely degasified and the occluded gases thus released increase the pressure within the tube 5 from one millimeter of mercury to a greater pressure depending upon the material, size and construction of the electrodes. This increased pressure within the tube 5 is sufficient to prevent the destruction of the electrodes at the potentials supplied by the transformer 21 and I have found by experiment that with composite electrodes such as that described in my copending United States Letters Patent application Serial No. 464,750, filed June 30, 1930, the gas pressure within the tube 5 may be increased from one millimeter of mercury to a value sufficient to extinguish the luminous column at the maximum voltage of the transformer in tubes 10 millimeters in diameter and as long as 20 feet. I prefer, however, to increase this pressure to about 5 millimeters of mercury as indicated on the pressure indicator 18, and to keep the gas pressure within the tube 5 substantially between 5 and 15 millimeters of mercury by alternately opening and closing the pump valve 16 when the pressure exceeds 15 millimeters.

At this pressure and at the voltage supplied by the transformer 21, the degasification of the electrodes 6 is carried on for about one minute after which the reactance 22 in the primary circuit of the transformer 21 is adjusted until the current delivered by the transformer to the gaseous conduction device is increased to ½ ampere or more for heating the walls of the tube 5.

I have found that the electrical energy required to heat the walls of the tube 5 in the short time necessary to prevent deleterious heat effects of the electrodes, is about 500 watts per foot of tube in the luminous column. At the increased pressure within the tube 5, and because of the increase of the current, the temperature of the electrodes increases very slowly, but the temperature of the luminous column increases very rapidly so that the walls of the tube are rapidly heated to the degasification stage. This increased pressure not only protects the electrodes from evaporation but prevents sputtering thereof by the pressure effect.

This increased current is permitted to flow until the walls of the tube 5 are heated sufficiently to completely degasify the tubes.

As a practical expedient for determining the temperature to which the electrodes of the tube 5 should be heated, I have found that this increased current should be permitted to flow until the electrodes are at a white heat. The switch 23 is immediately opened to electrically disconnect the electrodes 6 and the pump valve 16 is opened before the electrodes have cooled appreciably to permit exhausting the tube 5 of the gases within the tube. If the electrodes were permitted to remain at a white heat for an appreciable time, the heat from the electrodes would be conducted by the leads 7 to the seals 8 and probably would destroy the seals, and/or the heat radiated to or reaching the walls of the tube 5 by convection might be sufficient to melt the walls of the tube. Moreover, such a high heat if maintained, would cause the electrodes to sputter, but I have found that when the switch 23 is opened immediately after the electrodes are heated to white heat, and the pump valve 16 is opened, such deleterious effects of the heat are avoided.

The tube 5 is then pumped to a high vacuum and permitted to cool after which the pump valve 16 is closed and the valve 13 opened to admit the inert gas from the source or container 12 to the tube 5, at any desired pressure. Thus it will be seen that I have succeeded in simplifying the processing or conditioning of gaseous conduction devices or tubes, and have greatly reduced the length of time required for such processing or conditioning of the gaseous conduction devices. The time required to completely condition the gaseous conduction device as described above is only about five minutes from the time that the tube 5 is sealed on the pump until it is taken off, while in prior art methods the time required to condition a gaseous conduction device has been found to be twenty minutes or more.

While I employ a potential sufficiently great to destroy the electrodes of the tube at the pressure to which the atmosphere of the tube is reduced, such pressure is increased by the release of the gases occluded in the electrodes to a magnitude sufficient to protect the electrodes against such a large voltage. The high temperature caused by the large current results in the rapid degasification of the electrodes and renders the method of particular advantage in processing gaseous conduction devices employing high melting point metals or alloys as electrodes, because such metals or alloys when heated tend first to absorb the gases within the tube and as the heat is increased, to give off occluded gases. These metals and alloys must, therefore, when used as electrodes for gaseous conduction devices, be heated to a relatively high temperature in order to make them release the occluded gases more rapidly than they absorb gases within the gaseous conduction device or tube.

I do not wish, however, to limit my invention for use in the processing of high melting point electrodes such as the refractory metals or alloys thereof, because it will be apparent to one skilled in the art that the novel method of the invention may be advantageously practiced in the processing of gaseous conduction devices using low melting point electrodes.

While I have illustrated and described a specific embodiment of my invention, many modifications may be made without departing from the spirit of the invention, and I do not wish to be limited to the precise details set forth, but desire to avail myself of all changes within the scope of the appended claims.

Having thus described my invention, what I claim as new and desire to secure by Letters Patent of the United States is:

1. A method of processing gaseous conduction devices which comprises degasifying the electrodes of a gaseous conduction device having a reduced atmosphere, utilizing the gases so released from said electrodes to increase the gas pressure of said device and supplying 1000 volts per foot of said device to said electrodes whereby to condition the walls of the device by the luminous column established by the voltage supplied thereto.

2. A method of processing gaseous conduction devices which comprises conditioning the electrodes of a gaseous conduction device having a reduced atmosphere at a potential sufficient to destroy said electrodes, heating the walls of said device from the luminous column between said electrodes and utilizing the gas released by the degasification of said electrodes to protect the electrodes against deleterious effects of the degasifying potential.

3. A method of processing gaseous conduction tubes which comprises impressing 1000 volts per foot of tube on the electrodes of a gaseous conduction tube having a reduced atmosphere to provide a luminous column substantially filling said tube, and utilizing the gases released from said electrodes to prevent the destruction thereof.

4. A method of making gaseous conduction tubes which comprises supplying electrical energy to the electrodes of a gaseous conduction device, reducing the atmosphere of said device until a luminous column substantially filling the tube is established between said electrodes, increasing the current sufficiently to destroy said electrodes at the reduced atmosphere utilizing the occluded gases of said electrodes released by the heating thereof to prevent destruction of said electrodes conditioning the walls of said tube by the heat produced within the tube by the electrical energy supplied thereto, exhausting the tube and admitting a rare and inert gas.

5. A means for processing gaseous conduction tubes comprising means for supplying energy to condition the electrodes of a gaseous conduction tube having its rated potential equal to its open circuit potential, connections for conducting the energy from said means to said gaseous conduction tube, and means for automatically decreasing the rated voltage of the first said means as soon as current passes in said tube.

6. A means for processing gaseous conduction tubes comprising means for supplying energy to condition the electrodes of a gaseous conduction tube having its rated potential equal to its open circuit potential, connections for conducting the energy from said means to said gaseous conduction tube, and means for increasing the heat energy produced in said tube whereby to condition the walls of the said tube without destroying the electrodes.

7. Means for processing gaseous conduction tubes comprising means for supplying 1000 volts per foot of tube to the electrodes of a gaseous conduction tube and means automatically controlling the first said means to protect said electrodes from overloading.

8. A method of processing for gaseous conduction devices having electrodes, which comprises applying an electrical potential to said electrodes, evacuating said device until an electrical discharge occurs therebetween to heat said electrodes and the interior of said device, stopping said evacuation, continuing said discharge to release gases occluded in said electrodes and the walls of said device, and continuing said discharge until it is extinguished by the release of occluded gases.

9. The method of processing gaseous conduction tubes which comprises subjecting such a tube to an electrical potential, evacuating said tube until said potential causes an electrical discharge, stopping the evacuating process, heating said tube and releasing occluded gases by said discharge, and controlling the intensity of said discharge manually and by said releasing of occluded gases.

FREDERICK L. HUNTER, Jr.